US005111021A

United States Patent [19]

Jolys et al.

[11] Patent Number: 5,111,021

[45] Date of Patent: May 5, 1992

[54] LASER SURFACE TREATMENT NOZZLE WITH POWDER SUPPLY

[75] Inventors: Pascal Jolys, Meudon La Foret; Philippe Lagain, Toulouse, both of France

[73] Assignee: Societe Nationale Industrielle et Aerospatiale, Paris Cedex, France

[21] Appl. No.: 758,695

[22] Filed: Sep. 12, 1991 (Under 37 CFR 1.47)

[30] Foreign Application Priority Data

Oct. 16, 1990 [FR] France ................................ 90 12746

[51] Int. Cl.[5] ................................................ B23K 26/00

[52] U.S. Cl. ............................ 219/121.6; 219/121.63; 219/121.65; 219/121.84

[58] Field of Search ....................... 219/121.63, 121.64, 219/121.65, 121.66, 121.84, 121.85, 121.67, 121.72

[56] References Cited

U.S. PATENT DOCUMENTS 3,696,230 10/1972 Friedrich ......................... 219/121.6
4,121,085 10/1978 Diemer et al. .................... 219/121.6
4,724,299 2/1988 Hammeke ......................... 219/121.6
4,730,093 3/1988 Mehta et al. .................... 219/121.63
4,778,693 10/1988 Drozdowicz et al. ............. 427/53.1
4,804,815 2/1989 Everett ............................ 219/121.6

FOREIGN PATENT DOCUMENTS

382328 11/1964 Swiss .
2117731 7/1972 France .
2086264 5/1982 Great Britain .
202077 11/1986 EP .

*Primary Examiner*—C. L. Albritton

[57] ABSTRACT

To make it possible to carry out different types of surface treatment by laser, with powder supply or addition, such as surface depositiotn, alloying or incrustation, a nozzle (12) is proposed, whose body (16) can occupy an axially regulatable position with respect to the support (10) in which is located the focussing lens for the laser beam (F). In addition, the body (16) supports a protective skirt (56), whose axial position is also regulatable and which can be brought into contact with the surface of the substrate (S).

10 Claims, 2 Drawing Sheets

LASER SURFACE TREATMENT NOZZLE WITH POWDER SUPPLY

DESCRIPTION

Figure 1:
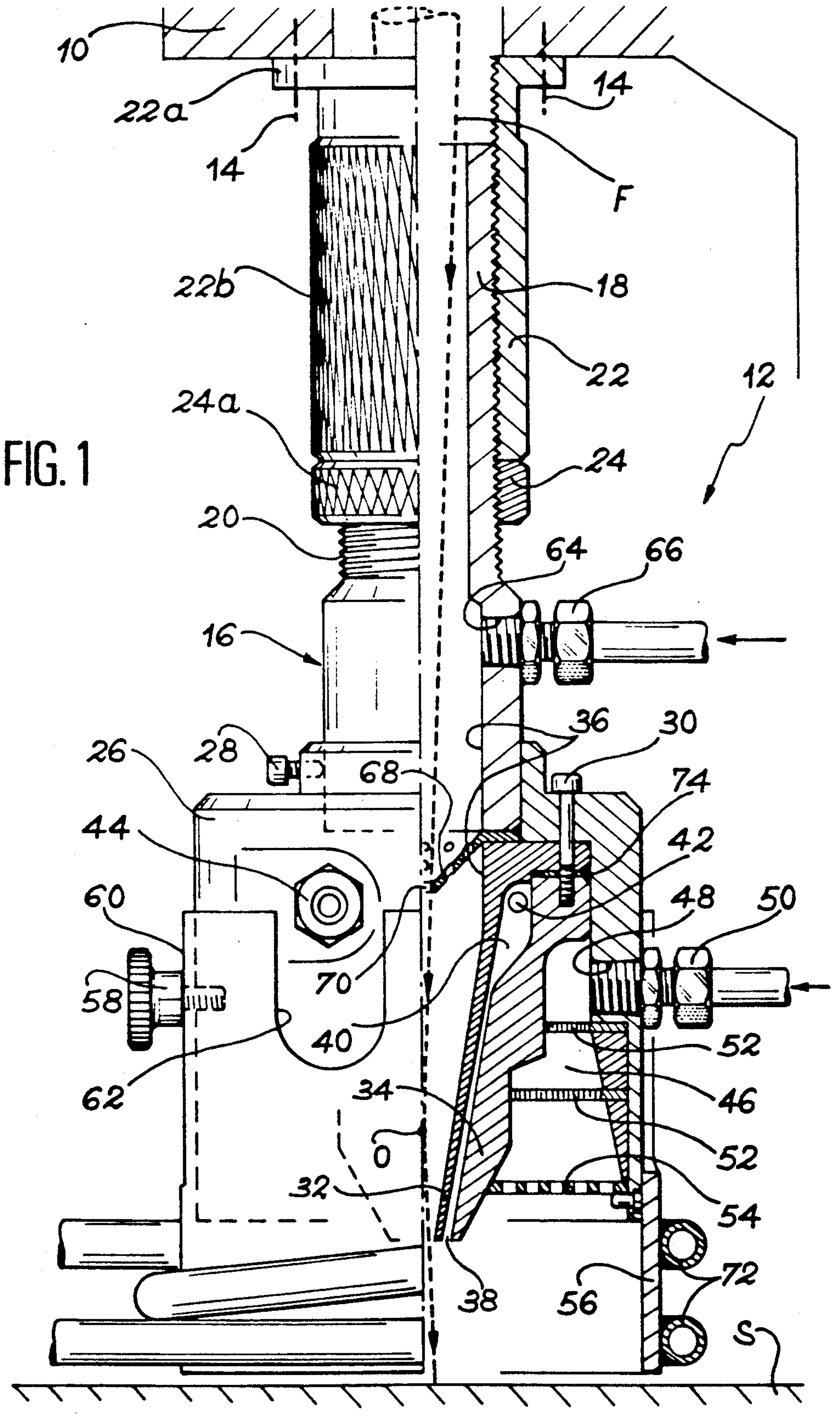

The invention relates to a nozzle making it possible to carry out a surface treatment on a substrate, by means of a laser beam and with a supply or addition of powder.

Such a nozzle makes it possible to inject a powder supply or addition material, carried by a carrier gas, into the laser beam, in the vicinity of the substrate. The laser beam energy melts at least one of the two materials, by conduction and convection phenomena, before the powder supply material is deposited by inertia and gravity on the substrate.

Although the carrier gas is neutral (generally argon or helium), it does not in itself ensure an effective protection against oxidation of the materials during treatment. Thus, the treatment nozzles comprise means making it possible to inject a neutral protective gas around the interaction zone between the laser beam and the materials.

As is more particularly illustrated by the article in French by Michel JEANDIN entitled "Treatments by Laser and Electron Beams—Bibliographical Synthesis of Treatments of Al, Cu and their alloys", published in the Journal Materiaux et Techniques, November/-December 1989, pp. 15 to 22, powder can be supplied either by using an auxiliary powder supply nozzle, or coaxially to the laser beam using the same nozzle for injecting the powder and for injecting the protective gas. In the latter case, the nozzle has a central passage for the laser beam, an annular, internal, convergent powder supply passage, and an annular, external protective gas supply passage, said three passages being formed coaxially in the nozzle body.

With respect to the two powder supply or addition methods mentioned in the aforementioned article, the coaxial method is simpler to carry out, because it does not impose a particular relative displacement direction between the nozzle and the substrate, which is not the case when the powder is supplied by means of an auxiliary nozzle. Moreover, the coaxial method makes it possible to better control the powder addition.

When using a nozzle for laser surface treatment with a coaxial powder supply, it has been found that the surface treatment is of a different nature as a function of the volume density of the powder contained in the carrier gas and as a function of the speed of the powder ejected by the nozzle. Thus, the more numerous the powder particles within the beam, the less significant the energy transmitted to the substrate by the laser through the particle cloud. Moreover, the higher the powder speed, the less the powder particles absorb the energy of the laser beam. Thus, by injecting a large number of particles at a relatively high speed, it is possible to melt the powder and not the substrate, in order to bring about a surface deposition.

However, if the powder volume density is low within the beam and if the powder particle speed remains relatively low, part of the energy supplied by the laser is absorbed by the particles, bringing about the melting or fusion thereof, whilst another part is transmitted through the particle cloud to melt the substrate. This gives an alloying on the substrate surface.

Finally, it is possible to obtain material incrustations on the substrate surface, if the particles are injected at high speed and with a very low volume density, so that they cannot be melted by the laser.

However, in practice, it would appear to be very difficult to regulate accurately both the volume density of the powder injected into the beam and the speed of the powder particles, so that no true distinction is made between these three treatment types.

The present invention specifically aims at a new type of nozzle, which makes it possible by simple settings to carry out a surface treatment of the deposition, alloying or incrustation type.

According to the invention, this result is obtained by means of a nozzle for the surface treatment of a substrate by laser and with the supply or addition of powder, comprising a body which can be fixed to a tubular support for supplying a focussed laser beam, a central passage for the laser beam, an internal, annular, convergent powder supply passage and an external, annular protective gas supply passage being coaxially formed in the said body, characterized in that the setting means displace the nozzle body with respect to a member for fixing the body to the support in accordance with the laser beam axis, a protective skirt being fitted so as to slide on the nozzle body and parallel to the said axis, so as to surround an area of regulatable length between a front end of the body and the substrate surface.

In the thus obtained nozzle, the regulating or setting means make it possible to displace the front end of the nozzle body between end positions, which are advantageously located on either side of the laser beam focussing point. By making the protective skirt slide on the nozzle body, it is possible to keep said skirt in contact with the substrate, no matter what position is occupied by the end of the nozzle body and also to vary the distance separating the substrate from the laser beam focussing point. As a result of these two settings, it becomes possible to vary the nature of the treatment carried out on the substrate surface, so as to perform either a surface deposition, or an alloying, or an incrustation by acting on the location of the powder injection area with respect to the focal point of the laser beam, as well as on the powder flow rate and speed.

Thus, a surface deposition can be carried out by giving the maximum value to the distance separating the end of the nozzle body from the substrate surface. Thus, the path of the particles is then sufficiently long to ensure the fusion or melting thereof. However, the energy of the beam transmitted to the substrate is inadequate to bring about the fusion due to the distance of the substrate from the laser beam focussing point and the large number of particles encountered by the laser beam before reaching the substrate surface.

Conversely, a material incrustation on the substrate surface is obtained by giving a minimum value to the distance separating the end of the nozzle body and the substrate surface. The travel time of the particles in the laser beam is then inadequate to ensure their melting or fusion. However, the relative proximity of the substrate to the laser beam focussing point and the small number of particles encountered by said beam ensure the local fusion of the substrate.

Finally, surface alloying can be obtained by adopting an intermediate position between the two aforementioned positions, for which both the powder and the substrate are melted by the laser beam.

In the nozzle according to the invention, the protective skirt participates in the same way as the protective gas in the protection of the materials against oxidation.

Therefore the injection flow rate of the protective gas can be relatively limited. The annular, external passage then has a cross-section well above that of the internal, annular passage and which increases on passing towards the front end of the nozzle body.

In order to ensure a maximum homogeneity distribution of the protective gas around the powder and the laser beam, at least one jet/stream or breaker is advantageously placed in the external, annular passage.

In addition, there is at least one protective gas intake issuing into the central passage in the nozzle body. This makes it possible to avoid any risk of the powder rising through the central passage up to the laser beam foccussing lens, which protects the said lens.

The protective gas injected in this way into the central passage, preferably at the same speed and same pressure as the protective gas injected through the external, annular passage, encounters at least one second jet breaker having a central opening for the laser beam, said jet breaker being located in the central passage between the said orifice and the front end of the nozzle body.

In order to ensure that the injection rate of powder into the laser beam precisely corresponds to the rate controlled from outside the nozzle, the internal, annular, convergent passage preferably has a width which increases progressively towards the front end of the nozzle body, so that the cross-section of said passage is substantially constant.

Moreover, the homogeneity of the powder injected into the laser beam is ensured by having a carrier gas and powder intake issuing tangentially at the end of the internal, annular, convergent passage opposite to the front end of the nozzle body.

In order to ensure an optimum absorbtion of the energy reflected by the powder and by the substrate, the protective skirt has an absorbent, internal coating and is equipped with cooling means.

Furthermore, the internal, annular passage is advantageously formed between two dismantlable parts of the body, which makes it possible to replace worn parts and, if appropriate, to place dismantlable shims between these dismantlable parts, in order to vary the cross-section of the internal, annular passage.

An embodiment of the invention is described in greater detail hereinafter with reference to the attached drawings, wherein show:

FIG. 1: A longitudinal sectional view showing a laser surface treatment nozzle with a supply of powder and in accordance with the invention.

Figure 2A:
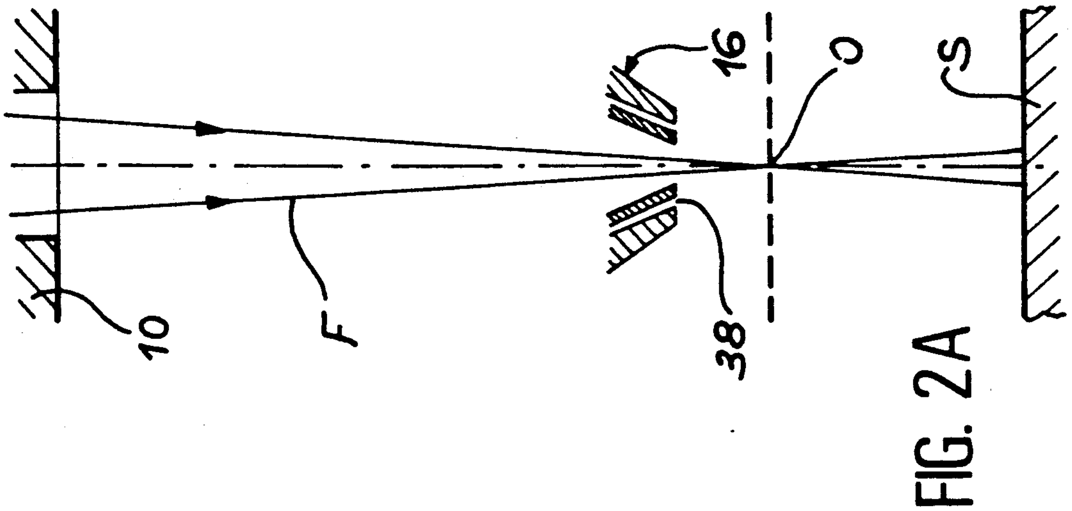
Figure 2B:
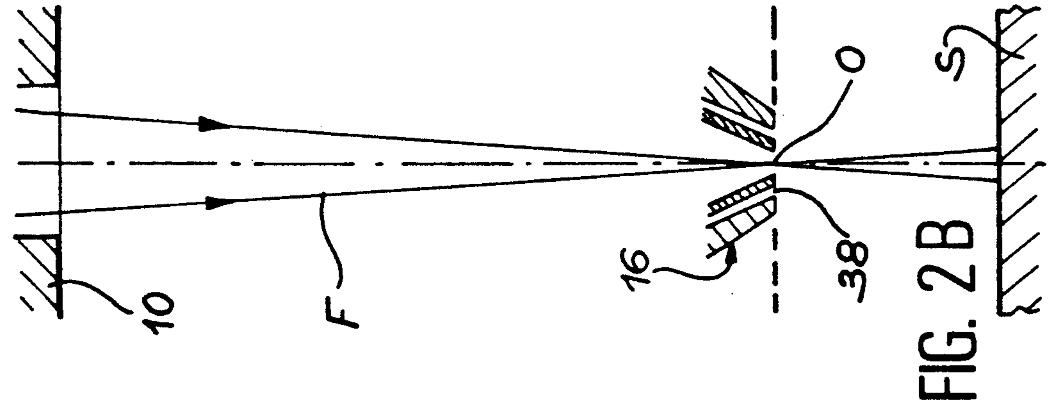
Figure 2C:
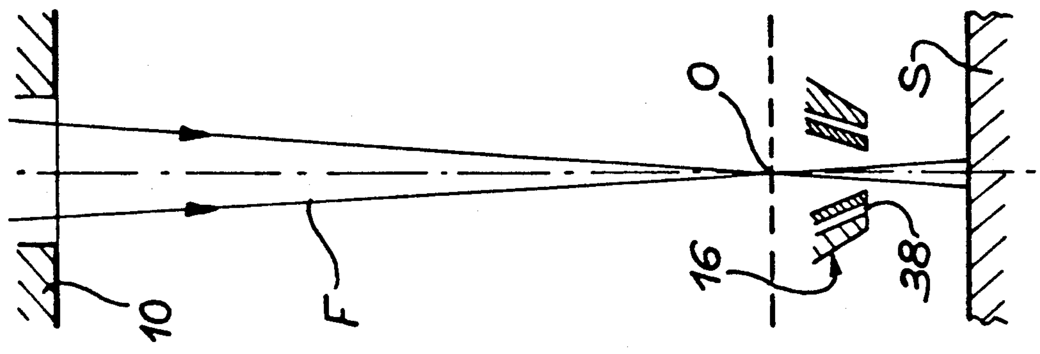

FIGS. 2A, 2B and 2C: Diagrammatically three relative positions between the end of the nozzle body, the substrate surface and the laser beam focussing point, allowed by the nozzle according to the invention and respectively corresponding to a surface deposition, an alloying and an incrustation.

In FIG. 1 reference numeral 10 designates a portion of the tubular support in which is placed a not shown focussing lens for a focussed laser beam F having a vertical axis.

A surface treatment nozzle, designated in general terms by the reference 12, is fixed below the tubular support 10 by fixing means such as screws 14. Nozzle 12 has a multipart body 16 with a symmetry of revolution around the vertical axis of the laser beam F. The body 16 comprises an upper tubular portion 18, whose upper end has a thread 20 on to which is screwed a tubular fixing member 22 terminated by a flange **22*a* at its upper end. This flange 22*a* is fixed to the support 10, e.g. by means of the aforementioned screws 14**.

This arrangement makes it possible to displace the body 16 of the nozzle 12 in accordance with the vertical axis of the laser beam F, relative to the support 10, by screwing the tubular portion 18 to a greater or lesser extent into the fixing member 22. A locknut 24, also screwed on to the thread 20 of the tubular portion 18 of the nozzle body, makes it possible to lock the tubular portion 18 and the fixing member 22 in a predetermined relative position.

In the embodiment illustrated in FIG. 1, the rotation of the fixing member 22 and the locknut 24 is carried out manually by acting on the knurled portions **22*b* and 24*a*** formed on the outer surfaces of these parts. This action makes it possible to regulate the position of the injection zone with respect to the nozzle outlet and the position of the laser beam focussing point.

The body 16 of the nozzle 12 also has a ring-like portion 26, whose smaller diameter upper end is received on the cylindrical lower end of the tubular portion 18 and is fixed to the latter, e.g. by means of a locking screw 28.

Within the ring-shaped portion 26 of the body 16 are dismantlably fixed, e.g. by screws 30, two coaxial, tubular portions 32, 34 of the body 16.

The tubular portion 32 of the body 16 has a truncated cone shape terminated at its upper end by a flange fixed to the ring-shaped portion 26 by screws 30. This tubular portion 32 is located in the extension of the tubular portion 18 of the body 16 and thus, forms over the entire length of the latter, a generally cylindrical, central passage 36, which is terminated by a convergent, truncated cone-shaped portion at the front or lower end of the body 16. This central passage 36 is dimensioned so as to enable the laser beam F, focussed at a point O, close to the front end of the nozzle body, to pass through the entire length of the latter.

Between the tubular portions 32, 34 of the nozzle body 16 is formed an internal, annular, convergent passage 38, whose diameter decreases progressively on moving towards the front end of the nozzle body. Moreover, the width of said passage 38 also progressively increases on passing towards the front end of the nozzle body, so that the cross-section of the passage 38 is uniform over its entire length.

The internal, annular passage 38 is supplied with powder and a carrier gas by an annular chamber 40 formed between the tubular portions 32, 34, opposite to the front end of the nozzle body. More specifically, the supply of powder and carrier gas takes place by two powder and carrier gas intakes 42, which traverse the portions 26 and 34 of the body 16 and issue tangentially into the annular chamber 40, thus permitting a uniform distribution of the powder within the said chamber. A coupling 44 makes it possible to connect each of the intakes 42 to a not shown powder and carrier gas supply tube.

An external, annular passage 46 having a very large cross-section compared with the internal, annular passage 38 is formed between the ring-shaped portion 26 and the tubular portion 34 of the body 16. This external, annular passage 46 has a divergent shape on passing towards the front end of the nozzle body. It is supplied at its end opposite to said front end e.g. by two diametrically opposite, radial protective gas intakes 48. Each of these intakes 48 can be connected to a not shown protective gas supply tube by a coupling 50.

The ring-shaped portion 26 of the nozzle body 16 supports, in the external, annular passage 46 between the protective gas intake 48 and its open, lower end, three jet breakers successively constituted by two screens 52 and a perforated plate 54. The function of these three jet breakers is to make the outflow of protective gas from the external, annular passage 46 uniform, in order to bring about minimum disturbance of the powder jet leaving the internal, annular passage 38.

A protective skirt 56 is fitted so as to slide around the ring-shaped portion 26 of the nozzle body 16, so as to completely surround an area between the front end of the nozzle 12 and the surface of a substrate S to be treated.

More specifically, the protective skirt 56 is in the form of a large diameter tube able to slide on the cylindrical, outer surface of the ring-shaped portion 26, parallel to the axis of the focussed laser beam F. The immobilization of the protective skirt 56 on the ring-shaped portion 26 of the nozzle body is ensured by means of a knurled locking screw 58, which traverses a longitudinal slot 60, which is open towards the top and formed in the skirt 56 and which is screwed into a tapped hole radially traversing the ring-shaped portion 26. When the screw 58 is tightened, it grips the skirt 56 against the portion 26 and immobilizes the said skirt. On loosening the screw 58, the skirt 56 can slide. The protective skirt 56 also has upwardly open, longitudinal notches 62 permitting the passage of the couplings 44, 50, no matter what the position occupied by the skirt 56 on the ring-shaped portion 26.

In order to protect the not shown focussing lens of the laser beam F, which is located in the support 10, against a possible rising of powder leaving the internal, annular passage 38, a protective gas intake 64 is formed in the tubular portion 18 of the nozzle body 16, in the vicinity of the ring-shaped portion 26. Said intake 64 receives a coupling 66 making it possible to connect a not shown, protective gas supply tube.

By connecting the couplings 66 and 50 to the same protective gas supply source, in the central passage 36 and in the external, annular passage 46, a neutral gas flow having the same speed and the same pressure is obtained. This feature makes it possible to prevent powder rising towards the focussing lens fitted in the support 10, whilst avoiding any disturbance to the outflow of powder from the internal, annular passage 38.

A jet breaker 68, constituted by a truncated cone-shaped, perforated grating, is advantageously placed between the intake 64 and the front end of the nozzle body 16, in the central passage 36. This jet breaker 68 can in particular be installed between the tubular portion 18 and the tubular portion 32 of the nozzle body 16, as illustrated in FIG. 1. It has a central opening 70 permitting the passage of the focussed laser beam F.

In the case where the laser associated with the nozzle 12, which has just been described, is a continuous $CO_2$ laser of wavelength 10.6 $\mu$m, the tubular portions 32 and 34 are advantageously made from copper, because this material only has a very limited absorbtion of the energy emitted by a laser of this type. In addition, to these two tubular portions is given the maximum thickness, so as to increase their thermal inertia.

The protective skirt 56 is designed so as to absorb to the maximum the energy reflected by the powder and by the substrate. Therefore its internal surface is advantageously coated with an absorbent material, such as a coating of black paint. The material forming it is chosen from among the good heat conducting materials and it can also be copper.

The heat absorbed by the protective skirt 56 is dissipated by cooling means associated therewith and constituted, in the embodiment of FIG. 1, by a cooling coil 72 surrounding the end of the skirt 56, which projects beyond the end of the nozzle body 16 and in which circulates a cooling fluid. The coil 72 is also preferably made from copper and it is connected to a not shown, auxiliary cooling system making it possible to cool the fluid circulating in the coil.

The tubular portions 32 and 34 of the nozzle body 16, which constitute the nozzle parts which can become worn can easily be replaced by removing the screws 30 so that, if appropriate, it is possible to modify the cross-section of the internal, annular passage 38, by placing one or more shims 74 between the flanges by which the tubular portions 32 and 34 are fixed to the ring-shaped portion 26 by means of screws 30.

As is diagrammatically shown in FIGS. 2A, 2B and 2C, the nozzle 12 according to the invention makes it possible to carry out different surface treatments by carrying out simple settings and without it being necessary to modify the volume density or the speed of the powder injected into the nozzle.

Thus, as illustrated in FIG. 2A, when the front end of the nozzle body 16 occupies its upper position as close as possible to support 10, which is positioned above the focussing point O of the laser beam F and when the protective skirt 56 is spread out to the maximum beyond said end, there is a surface deposition of the powder material injected by the internal, annular passage 38 onto the substrate S. The path of the powder particles leaving the passage 38 and injected into the laser beam F is then very long, so that these particles are melted before reaching the substrate. The substrate surface is relatively remote from the focussing point O of the laser beam F and the powder quantity present in the latter is relatively large, so that the energy of that part of the laser beam which reaches the substrate is inadequate to melt the latter.

FIG. 2B shows an intermediate position of the front end of the nozzle body 16, in which said end is substantially in the same plane as the laser beam focussing point O. Moreover, the spreading out of the protective skirt 56 beyond the end of the nozzle body 16 also has an intermediate value. In this case, the path of the powder particles passing out of the internal, annular passage 38, within the laser beam F, remains adequate to ensure the melting of these particles before they reach the surface of the substrate S. Moreover, said substrate is slightly closer to the laser beam focussing point O than in the preceding position illustrated in FIG. 2A and the powder particle cloud present between the end of the nozzle body 16 and the substrate surface is less thick, so that the energy of that part of the laser beam which reaches the surface of the substrate S remains adequate to melt the latter. With the powder and substrate melted, there is then an alloying of the surface of the substrate S.

In the position illustrated in FIG. 2C, the front end of the nozzle body 16 occupies its position furthest from the support 10, located beyond the focussing point O of the laser beam F. Moreover, the protective skirt 56 is retracted to the maximum on the nozzle body 16, so that the surface of the substrate S occupies an even closer position with respect to the laser beam focussing point O than in that illustrated in FIG. 2B. Under these conditions, the residence time of the powder particles leaving the internal, annular passage 38 in the laser beam F is inadequate for said particles to melt before reaching the surface of the substrate S. The relative proximity of the substrate surface to the laser beam focussing point O and the limited thickness of the particle cloud present between the end of the nozzle body 16 and the substrate surface lead to the melting of the latter. Thus, there is a powder particle incrustation in the substrate surface layers.

Therefore, it is possible by screwing the tubular portion 18 of the nozzle body to a greater or lesser extent into the fixing member 22 in order to axially displace the nozzle body with respect to the support 10, and by extending the protective skirt 56 to a greater or lesser extent by means of the screw 58, to regulate both the position of the front end of the nozzle body relative to the laser beam focussing point O and the distance separating the substrate surface, in contact with the protective skirt 56, from the said same focussing point. These simple settings make it possible to modify the nature of the surface treatment carried out on the substrate, without any other intervention being necessary.

Moreover, the presence of the protective skirt 56 helps to protect the materials present against oxidation and makes it possible to use a protective gas at a lower flow rate, which makes it easire to protect the beam focussing lens by the injection of the same protective gas at a low flow rate into the central passage 36.

In conventional manner, both the protective gas and the carrier gas can be argon. Obviously, the invention is not limited to the embodiment described and in fact covers all variants thereof. Thus, the means making it possible to displace the nozzle body parallel to the axis of the laser beam with respect to the support 10, as well as the means permitting the displacement of the protective skirt 56 in the same direction around the nozzle body can differ compared with those described.

We claim:

1. Nozzle for the surface treatment of a substrate by a laser and with a supply or addition of powder, comprising a body which can be fixed to a tubular support for the arrival of a focussed laser beam, a central passage for the laser beam, an internal, annular, convergent passage for supplying powder and an external, annular passage for supplying protective gas formed coaxially in the said body, wherein setting means are provided for displacing the nozzle body with respect to a member for fixing said body to the support, in accordance with the axis of the laser beam, a protective skirt being fitted so as to slide on the nozzle body, parallel to the said axis, in order to surround an area of regulatable length between a front end of the body and the substrate surface.

2. Nozzle according to claim 1, wherein the external annular passage has a cross-section larger than that of the internal, annular passage and which increases on passing towards the front end of the body.

3. Nozzle according to claim 2, wherein at least one jet breaker is placed in the external annular passage.

4. Nozzle according to claim 1, wherein at least one protective gas intake issuing into the central passage is formed in the nozzle body.

5. Nozzle according to claim 4, wherein at least one second jet breaker, provided with a central opening for the laser beam, is placed in the central passage between the said intake and the front end of the nozzle body.

6. Nozzle according to claim 1, wherein the internal, annular, convergent passage has a width which increases progressively towards the front end of the nozzle body, so that the cross-section of said passage is substantially constant.

7. Nozzle according to claim 1, wherein at least one powder and carrier gas intake, issuing tangentially at one end of the internal, annular, convergent passage opposite to the front end of the nozzle body is formed in the latter.

8. Nozzle according to claim 1, wherein the protective skirt is equipped with cooling means.

9. Nozzle according to claim 1, wherein the internal, annular passage is formed between two dismantlable portions of the body.

10. Nozzle according to claim 9, wherein the body has dismantlable shims, which can be placed between the portions of the body, in order to vary the cross-section of the internal, annular passage.

* * * * *

UNITED STATES PATENT AND TRADEMARK OFFICE

CERTIFICATE OF CORRECTION

PATENT NO. : 5,111,021

DATED : May 5, 1992

INVENTOR(S) : Pascal Jolys, et al

It is certified that error appears in the above-identified patent and that said Letters Patent is hereby corrected as shown below:

ON THE TITLE PAGE:

[73] Assignee: Aerospatiale Societe Nationale Industrielle

Signed and Sealed this

Twentieth Day of July, 1993

Attest:

MICHAEL K. KIRK

*Attesting Officer* *Acting Commissioner of Patents and Trademarks*